United States Patent
Gruner et al.

(10) Patent No.: US 10,955,824 B2
(45) Date of Patent: Mar. 23, 2021

(54) CONTROL UNIT AND METHOD FOR OPERATING AN INDUSTRIAL AUTOMATION SYSTEM COMMUNICATION NETWORK COMPRISING A PLURALITY OF COMMUNICATION DEVICES

(71) Applicant: Siemens Aktiengesellschaft, Munich (DE)

(72) Inventors: Axel Gruner, Nuremberg (DE); Johannes Riedl, Ergolding (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/624,759

(22) PCT Filed: Jun. 30, 2017

(86) PCT No.: PCT/EP2017/066284
§ 371 (c)(1),
(2) Date: Dec. 19, 2019

(87) PCT Pub. No.: WO2019/001729
PCT Pub. Date: Jan. 3, 2019

(65) Prior Publication Data
US 2020/0393816 A1 Dec. 17, 2020

(51) Int. Cl.
*G05B 19/4155* (2006.01)
*H04L 12/911* (2013.01)
*H04L 29/06* (2006.01)

(52) U.S. Cl.
CPC .......... *G05B 19/4155* (2013.01); *H04L 47/82* (2013.01); *H04L 63/102* (2013.01); *H04L 63/108* (2013.01); *G05B 2219/31229* (2013.01)

(58) Field of Classification Search
CPC .................................................. G05B 19/4155
(Continued)

(56) References Cited

U.S. PATENT DOCUMENTS 5,249,184 A * 9/1993 Woest ..................... H04L 29/06
370/402
5,359,595 A * 10/1994 Weddle ..................... H04J 1/12
370/468
(Continued)

FOREIGN PATENT DOCUMENTS

DE 10138363 2/2003
EP 2221682 8/2010
(Continued)

OTHER PUBLICATIONS

Braden et al., "Resource ReSerVation Protocol (RSVP)—Version 1 Functional Specification", RFC 2205, 1997 (Year: 1997).*
(Continued)

*Primary Examiner* — Ondrej C Vostal
(74) *Attorney, Agent, or Firm* — Cozen O'Connor

(57) ABSTRACT

A method for operating an industrial automation system communication network, wherein at least one control unit controls functions of a plurality of communication devices for operating a communication network that includes plurality of communication devices, where the communication network is subdivided into a plurality of partitions which each include a plurality of end nodes as service access points and predeterminable shares of system resources of communication devices, where guaranteeable service quality parameters, which may be mapped in a multi-dimensional service quality parameter matrix for each partition, are determined for each data transmission within the partitions, by a pair of end nodes and in a manner dependent on direction, where each partition is assigned uniquely to a respective user together with the guaranteeable service quality parameters, and where potentially available system resources and authorizations for each respective user are specified by the assigned.

14 Claims, 2 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 6,982,987 | B2* | 1/2006 | Cain | H04L 1/0041 370/442 |
| 7,050,396 | B1* | 5/2006 | Cohen | H04L 12/2854 370/235 |
| 2002/0018481 | A1* | 2/2002 | Mor | H04L 47/70 370/403 |
| 2004/0032847 | A1* | 2/2004 | Cain | H04W 40/06 370/338 |
| 2004/0136359 | A1* | 7/2004 | Ivancovsky | H04J 3/1694 370/352 |
| 2004/0218548 | A1* | 11/2004 | Kennedy | H04W 40/02 370/254 |
| 2010/0217423 | A1 | 8/2010 | Dingfelder et al. | |
| 2013/0061047 | A1* | 3/2013 | Sridharan | H04L 12/4666 713/162 |
| 2013/0268686 | A1 | 10/2013 | Wang et al. | |
| 2015/0089034 | A1* | 3/2015 | Stickle | H04L 41/18 709/223 |
| 2015/0188837 | A1* | 7/2015 | Djukic | H04L 43/06 709/226 |
| 2015/0195149 | A1* | 7/2015 | Vasseur | H04L 41/5019 370/252 |
| 2016/0197881 | A1 | 7/2016 | Albrecht | |
| 2019/0230046 | A1* | 7/2019 | Djukic | H04L 41/5009 |
| 2020/0233402 | A1* | 7/2020 | Sakic | H04L 41/0668 |

FOREIGN PATENT DOCUMENTS

| | | | |
|---|---|---|---|
| EP | 2795842 | 10/2014 | |
| EP | 2996004 | 3/2016 | |
| EP | 3001647 | 3/2016 | |
| EP | 3035606 | 6/2016 | |
| EP | 3035606 A1 * | 6/2016 | ......... H04L 12/4641 |

OTHER PUBLICATIONS

Heinanen et al., "Assured Forwarding PHB Group", RFC 2597, 1999 (Year: 1999).*
Jacobson et al., "An Expedited Forwarding PHB", RFC 2598, 1999 (Year: 1999).*
Nichols et al., "Definition of the Differentiated Services Field (DS Field) in the IPv4 and IPv6 Headers", RFC 2474, 1998 (Year: 1998).*
Yavatkar et al., "SBM (Subnet Bandwidth Manager): A Protocol for RSVP-based Admission Control over IEEE 802-style networks", RFC 2814, 2000 (Year: 2000).*
PCT International Search Report and Written Opinion of International Searching Authority dated Aug. 11, 2017 based on PCT Application No. PCT/EP2017/066284 filed Jun. 30, 2017.

* cited by examiner

CONTROL UNIT AND METHOD FOR OPERATING AN INDUSTRIAL AUTOMATION SYSTEM COMMUNICATION NETWORK COMPRISING A PLURALITY OF COMMUNICATION DEVICES

CROSS-REFERENCE TO RELATED APPLICATIONS

This is a U.S. national stage of application No. PCT/EP2017/066284 filed Jun. 30, 2017.

BACKGROUND OF THE INVENTION

1. Field of the Invention

The invention relates to industrial automation systems and, more particularly, to a control unit and method for operating an industrial automation system communication network comprising a plurality of communication devices.

2. Description of the Related Art

Industrial automation systems are used for monitoring open-loop and closed-loop control of technical processes, especially in the fields of production, process and building automation, and enable operation of control devices, sensors, machines and industrial systems, which is designed to occur as autonomously and independently of human intervention as possible. As a result of the steadily increasing importance of information technology for automation systems comprising numerous networked control and computer units, methods for reliably providing functions distributed via an automation system for providing monitoring, open-loop and closed-loop control functions are gaining increased importance. A set of problems in industrial automation systems results from message traffic consisting of relatively many, but relatively short messages, which reinforces the foregoing problems.

Software Defined Networking (SDN) aims to provide a visualization of communication network functions by functionally separating communication devices, such as routers or switches, into components assigned to a Control Plane and Data Plane. The Data Plane comprises functions and/or components for forwarding data packets or data frames. The Control Plane, on the other hand, comprises management functions for controlling the transport and/or the components of the Data Plane. The OpenFlow system, for example, defines a standard for software-implemented control planes. An abstraction of hardware as virtual services allows a manual configuration of the hardware to be dispensed with, in particular by creating a programmable, centralized control of network traffic. OpenFlow supports partitioning of system resources into network slices, which ensures provision of defined system resources independently of other existing network slices.

US 2013/268686 A1 discloses a method for sending a request to establish a connection, in which an OpenFlow switch sends a message with a parameter request to a configuration server to obtain connection parameters from an OpenFlow controller. In response to the message with the parameter request, the OpenFlow switch receives an IP address and a set of OpenFlow connection parameters from the configuration server, where the set of OpenFlow connection parameters comprises at least connection parameters of a first OpenFlow controller. The OpenFlow switch sends a message corresponding to the IP address and the set of OpenFlow connection parameters of the first OpenFlow controller with a request to set up a connection to the first OpenFlow controller. In this way, an automatic connection between an OpenFlow switch and an OpenFlow controller can be set up.

DE 10 138 363 A1 discloses a method for ensuring the quality of service of internet applications, in which internet applications are automatically adjusted and optimized by taking advantage of the resources of the IP access network and the end system existing at the time of launching the internet application. The QoS (Quality of Service) communication requirements of Internet applications to the IP access network are acquired and stored as application profiles. When the internet application is enabled, the currently available network resources of the IP access network are compared with the stored application profiles, and control data are determined. Based on the determined control data, the provision of network resources for the relevant internet application is optimized. The optimization here relates to an adapted timing sequence and the determination of the most favorable configuration from the point of view of cost aspects (transmission costs).

EP 2 795 842 B1 describes a control unit for providing communications services within a physical communication network. These communications services are used by multiple applications running on communication devices, for each of which requirements on the communication services are specified. The control unit is used to generate a communication network model that reproduces a topology of the physical communication network and comprises a network node model for each communication device. The network node model describes functions and resources of the respective communication device. In addition, for each application running on the communication devices the control unit calculates a virtual communication network, by the requirements of the respective application on the communication services being mapped onto the communication network model. The calculated virtual communication networks each comprise at least two (2) network nodes described by a network node model and a partition or network slice of selected communication network resources that are provided by the communication devices.

SUMMARY OF THE INVENTION

It is an object of the present invention to provide a control unit and method for the efficient and reliable operation of a communications network comprising numerous communication devices for an industrial automation system, which enables a demand-oriented guarantee of quality of service parameters, such as bandwidth, latency or availability for a plurality of different users.

This and other objects and advantages are achieved in accordance with the invention by a control unit and method for operating a communications network of an industrial automation system comprising a plurality of communication devices, where at least one control unit controls functions of a plurality of communication devices assigned to the control unit. The communication network is divided into a plurality of partitions, which each comprise a plurality of end nodes as service access points and predeterminable shares of system resources of communication devices, which are assigned to the respective partition. Guaranteeable service quality parameters are determined for each data transmission within the partition, by pairs of end nodes and in a direction-dependent manner, which may be mapped in a multi-dimensional quality of service parameter matrix for each partition. Quality of service parameters can comprise, for example, bandwidth, latency, availability, redundancy or available connections in a deterministic cycle.

In accordance with the invention, each partition together with the guaranteeable quality of service parameters is uniquely assigned to a user in each case. In the process, potentially available system resources or permissions for the user are defined by the associated partition in each case. For user-side communication service requests within a partition, the control unit determines a path between a first communication device at a first end node and a second communication device at a second end node via third communication devices within the partition assigned to the respective user. Preferably, in the context of user-side communication service requests, quality of service parameters are additionally specified for end-node pairs. Requested communication services are advantageously assigned permanently to each partition.

In accordance with the invention, the control unit verifies whether necessary system resources are available along the determined paths within the partition assigned to the respective user during a planned usage period. For the verification the user-side communication service requests are preferably compared against the determined guaranteeable quality of service parameters, which are mapped in the quality of service parameter matrix of the respective partition. In the case of a positive verification result, the control unit reserves system resources necessary for the communication service requests and controls routing or switching functions of the third communication devices in accordance with the determined paths. Advantageously, new or modified communication service requests may be easily taken into account during operation of the communication network. In addition, it is advantageous that specifications of communication service requests are independent of their implementation after successful verification against the guaranteeable quality of service parameters.

In accordance with an advantageous embodiment of the present invention, in the event of communication service requests the control unit verifies, based on each system policy, whether system resources for the respective user are limited within the partition assigned to the user and/or whether the user is authorized to use data streams with real-time requirements. In the case of a negative verification result, a warning is signaled.

The third communication devices preferably each comprise at least one transceiver unit, where each transceiver unit is assigned a plurality of transmit queues, to each of which access is granted to the respective transceiver unit for a definable access duration within a definable repetition cycle. In addition, for each user-requested data stream with real-time requirements, the control unit determines whether in at least one third communication device along the determined path a transmission window in a transmit queue can be assigned exclusively to the data stream. In the case of a negative determination result, the control unit signals at least one warning. On the other hand, in the case of a positive determination result, the control unit reserves necessary system resources for data streams with real-time requirements in accordance with determined paths and assignments of the transmit queues. Advantageously, the access periods and repetition cycles for the transmit queues of the third communication devices are controlled via Time Aware Shapers in accordance with Institute of Electrical and Electronics Engineers (IEEE) standard 802.1Qbv.

In accordance with a preferred embodiment of the method of the invention, the communication devices are associated with a Software Defined Network, which comprises a communication control level designated as the Control Plane and a data transfer level designated as the Data Plane. While the control unit is assigned to the control plane, the communication devices are assigned to the data plane. The partitions are, in particular, network slices and can be defined using an engineering system, either manually by a system administrator or automatically. In addition, the third communication devices preferably comprise routers or switches, and flow tables can be specified by the control unit, from which routing tables and/or forwarding tables can be derived for third communication devices assigned to the control unit.

The control unit in accordance with the invention is provided for implementing a method in accordance with the disclosed embodiments, includes a processor and memory, and is configured to control functions of a plurality of communication devices of a communication network, which are assigned to the control unit. The communication network is divided into a plurality of partitions, which each comprise a plurality of end nodes as service access points and predeterminable shares of system resources of communication devices, which are assigned to the respective partition. In addition, the control unit is configured to accept guaranteeable service quality parameters determined for a data transmission within each partition, in each case by pairs of end nodes and in a direction-dependent manner, which may be mapped in a multi-dimensional quality of service parameter matrix for each partition. Furthermore, the control unit is configured to assign each partition together with the guaranteeable quality of service parameters uniquely to a user in each case. In the process, potentially available system resources or permissions for the users are defined by the associated partition in each case.

In accordance with the invention, the control unit is additionally configured, for user-side communication service requests within a partition, to determine in each case a path between a first communication device at a first end node and a second communication device at a second end node via third communication devices within the partition assigned to the respective user. In addition, the control unit is configured to verify whether necessary system resources are available along the determined paths within the partition assigned to the respective user during a planned usage period. Furthermore, the control unit is configured to reserve system resources necessary for the communication service requests in each case in the event of a positive verification result, and to control routing or switching functions of the third communication devices in accordance with the determined paths.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail below by reference to an exemplary embodiment based on the drawings, in which.

DETAILED DESCRIPTION OF THE EXEMPLARY EMBODIMENTS

Figure 1:
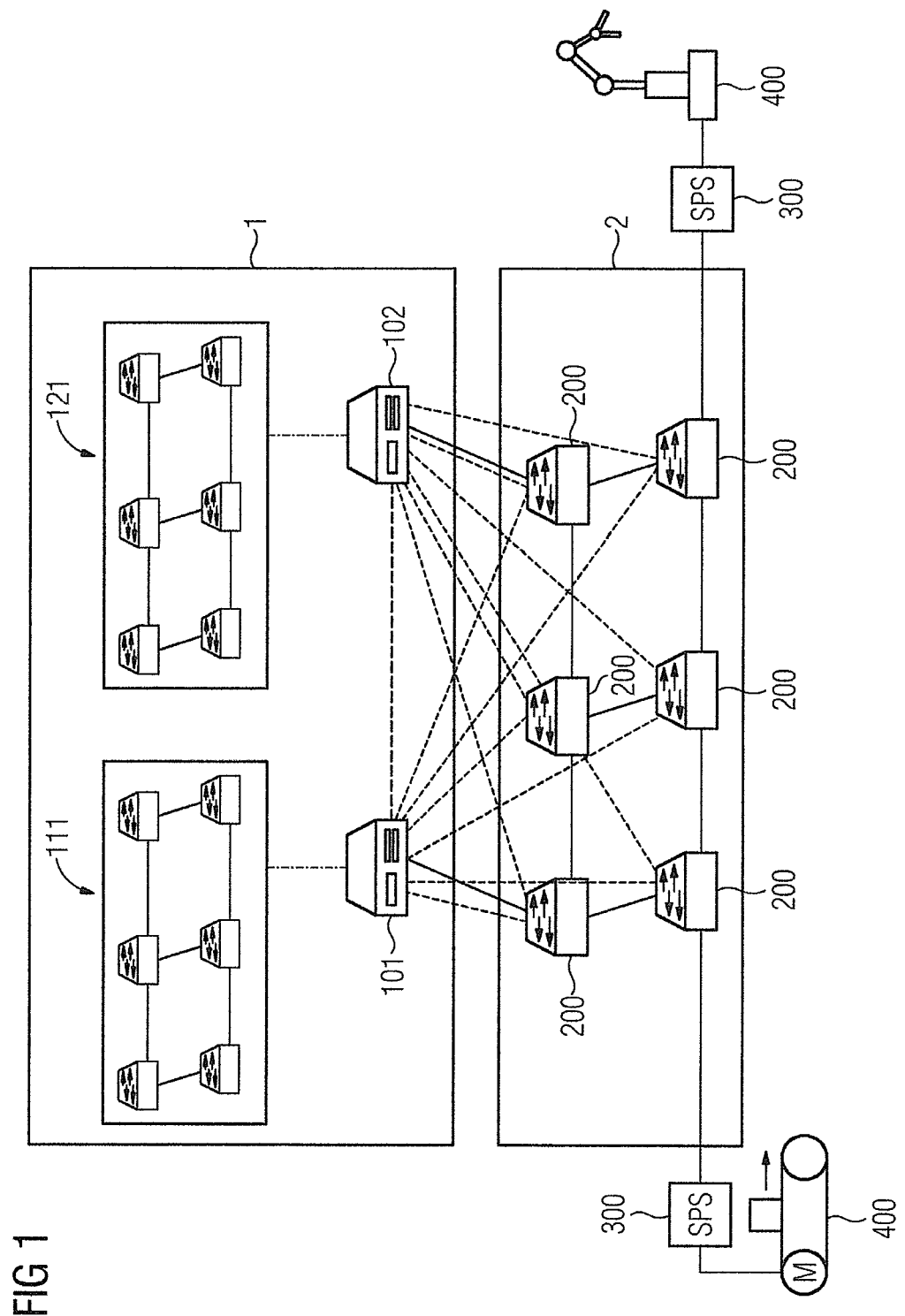
FIG. 1 a communication network of an industrial automation system comprising a plurality of communication devices and controller units associated thereto in accordance with the invention.

The communication network of an industrial automation system shown in FIG. 1 comprises a plurality of communication devices 200 and a plurality of control units 101, 102. The communication devices 200 can be, for example, switches, routers or firewalls and be used for the connection of programmable logic controllers 300 or input/output units of the industrial automation system. Programmable logic controllers 300 typically comprise a communication module, a central unit and at least one input/output unit (I/O module) and thus also constitute communication devices. Input/output units can in principle also be formed as distributed peripheral modules, which are arranged remote from a programmable logic controller.

Via the communication module, a programmable logic controller 300 is connected, for example, to a switch or router or additionally to a fieldbus. The purpose of the input/output unit is to exchange control and measurement variables between the programmable logic controller 300 and a machine or device 400 controlled by the programmable logic controller 300. The central unit is provided in particular for determining suitable control variables from the recorded measurement variables. The above components of the programmable logic controller 300 in the present exemplary embodiment are connected to each other via a backplane bus system.

The communication devices 200 in this exemplary embodiment are assigned to a Software Defined Network (SDN), which comprises a communication control level 1 designated as the control plane and a data transfer level 2 designated as the data plane. The control units 101, 102 as SDN controllers are assigned to the control plane, while the communication devices are assigned to the data plane. With the control units 101, 102, flow tables for switches or routers are defined, from which routing rules or forwarding rules for communication devices 200 assigned to the respective control unit 101, 102 are derived.

Figure 2:
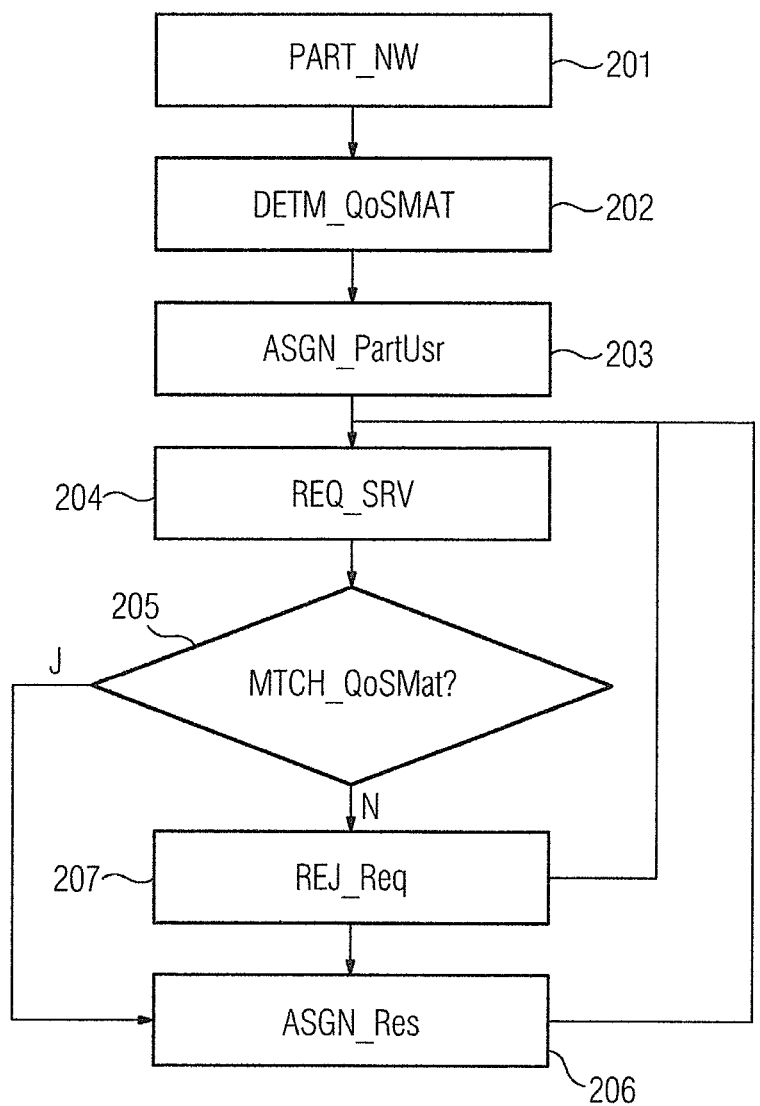
FIG. 2 an illustration of a process for the handling of communication service requests within the communication network shown in FIG. 1.

The control units 101, 102 are generally configured to control functions of a plurality of communication devices 200, which are assigned to the respective control unit. According to step 201 of the communication network shown in FIG. 2, the communication network is divided into a plurality of partitions, which each comprise a plurality of end nodes as service access points and predeterminable shares of system resources of communication devices 200, which are assigned to the respective partition. In the present exemplary embodiment, the partitions are network slices that can be defined using an engineering system, either manually by a system administrator or automatically. For each control unit 101, 102 a separate resource layer 111, 121 with the shares of system resources is provided.

Guaranteeable quality of service parameters are determined for a data transmission within the partitions, in each case by pairs of end nodes and in a direction-dependent manner, which are mapped in a multi-dimensional quality of service parameter matrix for each partition (step 202). Quality of service parameters can comprise, for example, bandwidth, latency, availability, redundancy or connections available in a deterministic cycle. In accordance with step 203, each partition together with the guaranteeable quality of service parameters is uniquely assigned to a user in each case. Each assigned partition will define potentially available system resources or permissions for the users.

In the context of user-side communication service requests, in accordance with step 204, quality of service parameters are additionally specified for pairs of end nodes. Requested communication services are permanently assigned to a partition in each case. For user-side communication service requests within a partition the control units 101, 102 determine in each case a path between a first communication device at a first end node and a second communication device at a second end node via third communication devices within the partition assigned to the respective user. On this basis, to verify the user-side communication service requests, they are compared against the quality of service parameter matrix of the respective partition. The control unit 101, 102 can therefore verify in accordance with step 205 whether necessary system resources are available along the determined paths within the partition assigned to the respective user during a planned usage period. In particular, in the event of communication service requests the control units 101, 102 verify, in each case based on system policies, whether system resources for the respective user are limited within the partition assigned to said user and/or whether the user is authorized to use data streams with real-time requirements.

In the case of a positive verification result, in accordance with step 206, the control units 101, 102 reserve system resources necessary for the communication service requests and control routing or switching functions of the third communication devices in accordance with the determined paths. By contrast, in the case of a negative verification result a warning signal is issued (step 207). This is followed in both cases by the acceptance of new user-side communication service requests (step 204).

The third communication devices each comprise at least one transceiver unit. Each transceiver unit is preferably assigned a plurality of transmit queues, to each of which access is granted to the respective transceiver unit for a definable access duration within a definable repetition cycle. In the context of the above steps, for each user-requested data stream with real-time requirements, the control units 101, 102 determine whether, in at least one third communication device along the determined path, a transmission window in a transmit queue can be assigned exclusively to said data stream. While the control units 101, 102 signal at least one warning in the case of a negative determination result, in the case of a positive determination result they reserve required system resources for data streams with real-time requirements in accordance with determined paths and assignments of the transmit queues. Preferably, the access periods and repetition cycles for the transmit queues of the third communication devices (200) are controlled via Time Aware Shapers in accordance with IEEE 802.1Qbv.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method comprising:
operating an industrial automation system communication network comprising a plurality of communication devices, at least one control unit controlling functions of a plurality of communication devices which are assigned to the at least one control unit;
dividing the communication network into a plurality of partitions, which each comprise a plurality of end nodes as service access points and predetermined shares of system resources of the plurality of communication devices, which are assigned to a respective partition;
determining guaranteed service quality parameters for a data transmission within each partition, by pairs of end nodes and in a direction-dependent manner, which are mapped in a multi-dimensional quality of service parameter matrix for each partition;
assigning uniquely each partition together with the determined guaranteed service quality parameters to a respective user, at least one of (i) potentially available system resources and (ii) permissions for respective users being defined by each uniquely assigned partition;
determining, by the at least one control unit, for each user-side communication service request within a partition a path between a first communication device of the plurality of communication devices at a first end node and a second communication device of the plurality of communication devices at a second end node via third communication devices of the plurality of communication devices within the partition assigned to the respective user;
verifying, by the at least one control unit, whether necessary system resources are available along determined paths within the partition assigned to the respective user during a planned usage period; and
reserving, by the at least one control unit, system resources necessary for each communication service request in an event of a positive verification result and controlling, by the at least one control unit one of (i) routing and (ii) switching functions of the third communication devices in accordance with the determined paths.

2. The method as claimed in claim 1, further comprising:
verifying, by the at least one control unit, based on each system policy, whether at least one of (i) system resources for the respective user are limited within the partition assigned to said user in an event of communication service requests and (ii) the user is authorized to use data streams with real-time requirements in the event of communication service requests; and
signaling a warning in the case of a negative verification result.

3. The method as claimed in claim 1, wherein the third communication devices each comprise at least one transceiver unit and each transceiver unit is assigned a plurality of transmit queues, to each of which access is granted to a respective transceiver unit for a defined access duration within a defined repetition cycle, the method further comprising:
determining, by the at least on control unit, for each user-requested data stream with real-time requirements whether, in at least one third communication device along the determined path, a transmission window in a transmit queue is exclusively assigned to said data stream;
signaling, by the at least one control unit at least one warning in cases of a negative determination result; and
reserving, by the at least one control unit, necessary system resources for data streams with real-time requirements in accordance with determined paths and assignments of the transmit queues in cases of a positive determination result.

4. The method as claimed in claim 2, wherein the third communication devices each comprise at least one transceiver unit and each transceiver unit is assigned a plurality of transmit queues, to each of which access is granted to a respective transceiver unit for a defined access duration within a defined repetition cycle, the method further comprising:
determining, by the at least on control unit, for each user-requested data stream with real-time requirements whether, in at least one third communication device along the determined path, a transmission window in a transmit queue is exclusively assigned to said data stream;
signaling, by the at least one control unit at least one warning in cases of a negative determination result; and
reserving, by the at least one control unit, necessary system resources for data streams with real-time requirements in accordance with determined paths and assignments of the transmit queues in cases of a positive determination result.

5. The method as claimed in claim 3, wherein the access periods and repetition cycles for the transmit queues of the third communication devices are controlled via Time Aware Shapers in accordance with Institute of Electrical and Electronics Engineers (IEEE) Standard 802.1Qbv.

6. The method as claimed in claim 1, wherein the plurality of communication devices are assigned to a Software Defined Network, which comprises a communication control level designated as a Control Plane and a data transfer level designated as a Data Plane;
wherein the at least one control unit is assigned to the Control Plane; and
wherein the plurality of communication devices are assigned to the Data Plane.

7. The method as claimed in claim 6, wherein the partitions are defined utilizing an engineering system one of (i) manually by a system administrator and (ii) automatically.

8. The method as claimed in claim 6, wherein the third communication devices comprise at least one of (i) routers and (ii) switches in which flow tables are specified by the at least one control unit, from which at least one of (i) routing tables and (ii) forwarding tables are derived for third communication devices assigned to the at least one control unit.

9. The method as claimed in claim 7, wherein the third communication devices comprise at least one of (i) routers and (ii) switches in which flow tables are specified by the at least one control unit, from which at least one of (i) routing tables and (ii) forwarding tables are derived for third communication devices assigned to the at least one control unit.

10. The method as claimed in claim 1, wherein each requested communication service is permanently assigned a partition.

11. The method as claimed in claim 1, wherein quality of service parameters comprise at least one of (i) bandwidth, (ii) latency, (iii) availability, (iv) redundancy and (v) available connections in a deterministic cycle.

12. The method as claimed in claim 1, wherein quality of service parameters are additionally specified for end node pairs in a context of user-side communication service requests.

13. The method as claimed in claim 12, wherein for verification purposes the user-side communication service requests are compared against the determined guaranteed quality of service parameters, which are mapped in the service quality parameter matrix of the respective partition.

14. A control unit comprising:

a processor; and memory;

wherein the processor is configured to:

control functions of a plurality of communication devices of an industrial automation system communication network which are assigned to the control unit, the communication network being divided into a plurality of partitions, which each comprise a plurality of end nodes as service access points and predetermined shares of system resources of the plurality of communication devices which are assigned to the respective partition;

accept guaranteed service quality parameters determined for each data transmission within each partition, by pairs of end nodes and in a direction-dependent manner, which may are mapped in a multi-dimensional quality of service parameter matrix for each partition;

assign each partition together with each guaranteed service quality parameters uniquely to a respective user, at least one of (i) potentially available system resources and (ii) permissions for each respective user being defined by the assigned partition;

determine for each user-side communication service requests within a partition a path between a first communication device of the plurality of communication devices at a first end node and a second communication device of the plurality of communication devices at a second end node via third communication devices of the plurality of communication devices within the partition assigned to the respective user;

verify whether necessary system resources are available along the determined paths within the partition assigned to the respective user during a planned usage period;

reserve system resources necessary for each communication service request in an event of a positive verification result; and control at least one of (i) routing and (ii) switching functions of the third communication devices in accordance with the determined paths.

* * * * *